(12) United States Patent
Han et al.

(10) Patent No.: US 10,445,295 B1
(45) Date of Patent: Oct. 15, 2019

(54) TASK-BASED FRAMEWORK FOR SYNCHRONIZATION OF EVENT HANDLING BETWEEN NODES IN AN ACTIVE/ACTIVE DATA STORAGE SYSTEM

(71) Applicant: EMC IP Holding Company LLC, Hopkinton, MA (US)

(72) Inventors: Geng Han, Beijing (CN); Shaoqin Gong, Beijing (CN); Ilya Usvyatsky, Northborough, MA (US); Jian Gao, Beijing (CN); Xinlei Xu, Beijing (CN); Lifeng Yang, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 222 days.

(21) Appl. No.: 15/662,797

(22) Filed: Jul. 28, 2017

(51) Int. Cl.
  G06F 17/30 (2006.01)
  G06F 16/178 (2019.01)
  G06F 16/182 (2019.01)
  G06F 16/185 (2019.01)

(52) U.S. Cl.
  CPC ........ *G06F 16/178* (2019.01); *G06F 16/1844* (2019.01); *G06F 16/185* (2019.01)

(58) Field of Classification Search
  USPC ........................................................ 707/610
  See application file for complete search history.

(56) References Cited

U.S. PATENT DOCUMENTS

| 6,178,521 | B1 | 1/2001 | Filgate | |
|---|---|---|---|---|
| 7,000,086 | B2 | 2/2006 | Meiri et al. | |
| 8,335,899 | B1 | 12/2012 | Meiri et al. | |
| 8,412,977 | B2 | 4/2013 | Fujibayashi | |
| 2003/0191795 | A1* | 10/2003 | Bernardin | G06F 9/505 718/105 |
| 2007/0233870 | A1* | 10/2007 | Goto | G06F 9/5033 709/226 |
| 2012/0324449 | A1* | 12/2012 | Huetter | G06F 9/5066 718/1 |
| 2016/0357676 | A1* | 12/2016 | Cain, III | G06F 9/48 |

OTHER PUBLICATIONS

"What is Active/Active?" The Availability Digest, Oct. 2006, pp. 1-5.

* cited by examiner

*Primary Examiner* — Hicham Skhoun
(74) *Attorney, Agent, or Firm* — BainwoodHuang (57) ABSTRACT

Technology for synchronizing event handling between a primary storage processor and a secondary storage processor in an active/active data storage system. A single working task descriptor is selected at a time for uninterruptible execution, from a task scheduling queue that is maintained only on the primary storage processor. A copy of the working task descriptor is transmitted to the secondary storage processor. The working task descriptor is executed on both the primary storage processor and the secondary storage processor and without interruption by execution of any other task descriptor. Execution of the working task descriptor includes simultaneously transitioning through individual task states on both the primary storage processor and the secondary storage processor, and simultaneously executing functions on both the primary storage processor and the secondary storage processor during associated task states.

20 Claims, 7 Drawing Sheets

TASK-BASED FRAMEWORK FOR SYNCHRONIZATION OF EVENT HANDLING BETWEEN NODES IN AN ACTIVE/ACTIVE DATA STORAGE SYSTEM

TECHNICAL FIELD

The present disclosure relates generally to active/active data storage systems, and more specifically to technology for providing a task-based framework for event handling synchronization between peer nodes in an active/active data storage system.

BACKGROUND

Data storage systems in general are arrangements of hardware and software that typically include one or more storage processors coupled to arrays of non-volatile data storage devices, such as magnetic disk drives, electronic flash drives, and/or optical drives. The storage processors service host I/O operations received from host machines. The received I/O operations specify one or more storage objects (e.g. logical disks or "LUNs") that are to be written, read, created, or deleted. The storage processors run software that manages incoming I/O operations and performs various data processing tasks to organize and secure the host data that is received from the host machines and then stored on the non-volatile data storage devices.

In an active/active data storage system, two separate nodes operate to concurrently receive and process host I/O operations that are directed to a single storage object. Load balancing may advantageously be performed in order to spread host I/O operations evenly between the two nodes. Host machines are able to access the storage object through two different access paths, and high availability is provided since one node can continue to receive and process host I/O operations directed to the storage object even in the case where the other node has failed or become unreachable. Host write I/O operations may be mirrored between the two nodes, such that any write I/O operation received and performed by one of the nodes is also mirrored to the other node.

During operation of an active/active data storage system, many types of events occur that require event handling that must be synchronized between the two nodes. Such events include, for example, failure of a data storage device. In the case of detecting the failure of a data storage device, examples of actions that must potentially be synchronized between the two nodes may include i) stopping subsequent host I/O operations from being received and processed, ii) allocating storage on one or more of the remaining data storage devices to be used to replace the storage on the failed data storage device, iii) updating the contents of one or more mapping tables to indicate the newly allocated storage, iv) restarting receipt and processing of host I/O operations, and v) rebuilding the data from the failed device onto the newly allocated storage.

SUMMARY

Unfortunately, previous active/active data storage systems have exhibited significant shortcomings with regard to synchronization of actions between nodes in response to the detection of various events. Many events require multiple separate actions to be synchronized between the two nodes. In some previous systems, each action performed during event handling has required the allocation of a separate cluster flag to provide synchronization between the two nodes. Cluster flags must generally be allocated from a special cluster memory, the contents of which is mirrored between the two nodes, and the amount of which is significantly limited in typical storage processors. Since previous systems required that an individual cluster flag be allocated to provide synchronization between the nodes when each action is performed, processing large numbers of actions required allocation of correspondingly large numbers of cluster flags from the limited amount of cluster memory available to the storage processors. Accordingly, the cost of supporting increasing numbers of actions that must be synchronized between the two storage processors became prohibitively costly in terms of the amount of cluster memory consumed.

In addition, different events must be handled at different levels of priority, and multiple events may occur within short periods of times. In previous systems, actions taken in response to high priority events could interrupt actions taken in response to lower priority events. In such cases, cluster flags set while processing the lower priority events were difficult to clear in a comprehensive and consistent way, since many different combinations of cluster flag settings could exist at the time processing of a higher priority event begins. The problem of accurately clearing previously set cluster flags was especially complex in the case where a storage processor failed during processing of a higher priority event. As a result, residual cluster flag settings that were not properly cleared could cause significant errors to occur during the handling of subsequent events.

To address the above described and other shortcomings of previous solutions, new technology is disclosed herein for synchronizing event handling between a primary storage processor and a secondary storage processor in an active/active data storage system. In the disclosed technology, a task scheduling queue is maintained only on the primary storage processor. The task scheduling queue contains multiple task descriptors, and each task descriptor is associated with an event. Each task descriptor is placed on the scheduling queue in response to detection of the event associated with that task descriptor. Each task descriptor indicates an ordered set of task states, and each task state is associated with a corresponding one of a set of functions that are to be executed in response to detection of the event associated with the task descriptor.

One working task descriptor is selected at a time, from the task scheduling queue on the primary storage processor, for uninterrupted execution on both the primary storage processor and the secondary storage processor.

A copy of the working task descriptor is transmitted from the primary storage processor to the secondary storage processor.

The working task descriptor is executed on both the primary storage processor and the secondary storage processor. Execution of the working task descriptor on the primary storage processor and the secondary storage processor cannot be interrupted by execution of any other task descriptor. Execution of the working task descriptor includes simultaneously transitioning through individual ones of the task states indicated by the working task descriptor on both the primary storage processor and the secondary storage processor, one task state at a time, in the order of the task states indicated in the working task descriptor, and, during each one of the task states indicated in the working task descriptor, executing the function associated with the task state on both the primary storage processor and the secondary storage processor.

Embodiments of the disclosed technology may provide significant advantages over previous event handling solutions in active/active data storage systems. Specifically, by selecting a single working task descriptor at a time for execution, preventing interruption of the execution of the working task descriptor, and executing functions within the task descriptor according to corresponding task states that occur simultaneously on both the primary storage processor and the secondary storage processor, the disclosed technology serializes execution of task descriptors and functions within task descriptors in a way that eliminates the need to allocate large numbers of different cluster flags to synchronize actions between the two storage processors of an active/active data storage system. Embodiments of the disclosed technology instead synchronize functions using a much smaller number of cluster flags, resulting in less consumption of the limited resource of cluster memory. In addition, the disclosed technology reduces the complexity of processing required to support the execution of different priorities of task descriptors, and accordingly greatly reduces the likelihood of errors occurring due to failure to clear cluster flags. Further, by maintaining the scheduling queue only on the primary storage processor, the disclosed technology avoids consistency problems that would otherwise arise if large numbers of task descriptors scheduled for execution were maintained on both the primary storage processor and the secondary storage processor.

Other features and advantages of the disclosed technology are described below.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that the embodiments described below are provided only as examples, in order to illustrate various features and principles of the invention, and that the invention is broader than the specific embodiments described below.

Figure 1:
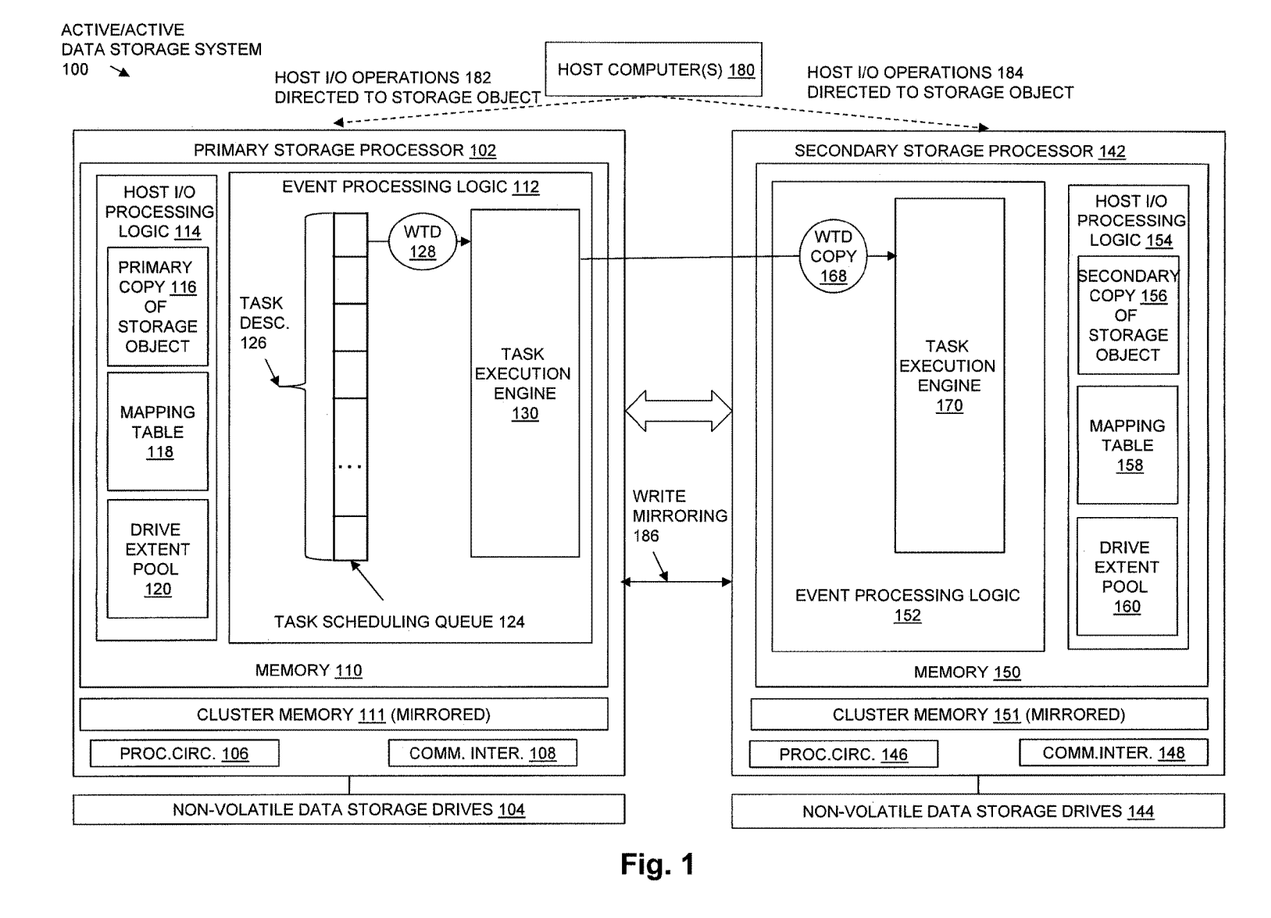
FIG. 1 is a block diagram showing an operational environment for the disclosed technology, including an example of an active/active data storage system including a primary storage processor and a secondary storage processor on which is provided an example embodiment of the disclosed technology.

FIG. 1 is a block diagram showing an operational environment for the disclosed technology, including an example of an Active/Active Data Storage System 100 that includes a Primary Storage Processor 102 and a Secondary Storage Processor 142, and in which is shown an example embodiment of the disclosed technology. Some number of host computing devices, referred to as "hosts" and shown for purposes of illustration by Host Computer(s) 180, access non-volatile data storage provided by Active/Active Data Storage System 100, for example over one or more computer networks, such as a local area network (LAN), and/or a wide area network (WAN) such as the Internet, etc., that may be located between Host Computer(s) 180 and the Active/Active Data Storage System 100. For example, Primary Storage Processor 102 may communicate with Host Computer(s) 180 using Communication Interfaces 108, and Secondary Storage Processor 142 may communicate with Host Computer(s) 180 using Communication Interfaces 148. Communication Interfaces 108 and Communication Interfaces 148 may, for example, each include one or more network interface adapters for transmitting and/or receiving electronic and/or optical signals over one or more computer networks located between Host Computer(s) 180 and the Active/Active Data Storage System 100.

Active/Active Data Storage System 100 includes at least one array of physical non-volatile data storage drives, shown for purposes of illustration in FIG. 1 by Non-Volatile Data Storage Drives 104 and Non-Volatile Data Storage Drives 144. Primary Storage Processor 102 and Secondary Storage Processor 142 may, for example, each be provided as a circuit board assembly, or "blade," which plugs into a chassis that encloses and cools multiple storage processors. The chassis may have a backplane for interconnecting Primary Storage Processor 102 and Secondary Storage Processor 142, and additional or alternative connections between Primary Storage Processor 102 and Secondary Storage Processor 142 that support communication between Primary Storage Processor 102 and Secondary Storage Processor 142 using one or more cables. However, no particular hardware configuration is required, and Primary Storage Processor 102 and/or Secondary Storage Processor 142 may each be embodied as any specific type of computing device capable of processing host input/output (I/O) operations received from Host Computer(s) 180 (e.g. I/O read and I/O write operations, create storage object operations, delete storage object operations, etc.).

Non-Volatile Data Storage Drives 104 and Non-Volatile Data Storage Drives 144 may include non-volatile data storage drives such as magnetic disk drives, solid state drives, hybrid drives, and/or optical drives. Non-Volatile Data Storage Drives 104 may be directly physically connected to and/or contained within Primary Storage Processor 102, and/or may be communicably connected to Primary Storage Processor 102 by way of one or more computer networks, e.g. including or consisting of a Storage Area Network (SAN) or the like. Similarly, Non-Volatile Data Storage Drives 144 may be directly physically connected to and/or contained within Secondary Storage Processor 142, and/or may be communicably connected to Secondary Storage Processor 142 by way of one or more computer networks, e.g. including or consisting of a Storage Area Network (SAN) or the like.

A Memory 110 in Primary Storage Processor 102 stores program code that is executable on Processing Circuitry 106. Memory 110 may include volatile memory (e.g. RAM), and/or other types of memory. The Processing Circuitry 106 may, for example, include or consist of one or more microprocessors, e.g. central processing units (CPUs), multi-core processors, chips, and/or assemblies, and associated circuitry. Processing Circuitry 106 and Memory 110 together form control circuitry, which is configured and arranged to carry out various methods and functions of Primary Storage Processor 102 as described herein. The Memory 110 stores a variety of software components that may be provided in the form of executable program code. For example, as shown in FIG. 1, Memory 110 may include software components such as Event Processing Logic 112 and Host I/O Processing Logic 114. When the program code is executed by Processing Circuitry 106, Processing Circuitry 106 is caused to carry out the operations of these software components. Although certain software components are shown and described for purposes of illustration and explanation, those skilled in the art will recognize that Memory 110 may include various other software components, such as an operating system, various applications, processes, etc.

A Memory 150 in Secondary Storage Processor 142 stores program code that is executable on Processing Circuitry 146. Memory 150 may include volatile memory (e.g. RAM), and/or other types of memory. The Processing Circuitry 146 may, for example, include or consist of one or more microprocessors, e.g. central processing units (CPUs), multi-core processors, chips, and/or assemblies, and associated circuitry. Processing Circuitry 146 and Memory 150 together form control circuitry, which is configured and arranged to carry out various methods and functions of Secondary Storage Processor 142 as described herein. The Memory 150 stores a variety of software components that may be provided in the form of executable program code. For example, as shown in FIG. 1, Memory 150 may include software components such as Event Processing Logic 152 and Host I/O Processing Logic 154. When the program code is executed by Processing Circuitry 146, Processing Circuitry 146 is caused to carry out the operations of these software components. Although certain software components are shown and described for purposes of illustration and explanation, those skilled in the art will recognize that Memory 150 may include various other software components, such as an operating system, various applications, processes, etc.

Primary Storage Processor 102 further includes Cluster Memory 111. The contents of Cluster Memory 111 can be modified by software executing on Primary Storage Processor 102, and can be read by software executing on Secondary Storage Processor 142. For example, the contents of Cluster Memory 111 may be accessible to software executing on both Primary Storage Processor 102 and Secondary Storage Processor 142 through a local computer bus to which Primary Storage Processor 102 and Secondary Storage Processor 142 are both connected, such as a Peripheral Component Interconnect (PCI) or the like. As described further herein, a number of specific cluster flags located in Cluster Memory 111 may be associated with Primary Storage Processor 102. Each cluster flag located in Cluster Memory 111 that is associated with Primary Storage Processor 102 may be set and cleared by software executing in Primary Storage Processor 102. The value of each cluster flag associated with Primary Storage Processor 102 and located in Cluster Memory 111 (e.g. set or cleared) may be read by software executing in Secondary Storage Processor 142. In this way, the contents of Cluster Memory 111 is mirrored from Primary Storage Processor 102 to Secondary Storage Processor 142.

Secondary Storage Processor 142 further includes Cluster Memory 151. The contents of Cluster Memory 151 can be modified by software executing on Secondary Storage Processor 142, and can be read by software executing on Primary Storage Processor 102. For example, the contents of Cluster Memory 151 may be accessible to software executing on Primary Storage Processor 102 and Secondary Storage Processor 142 through a local computer bus to which Primary Storage Processor 102 and Secondary Storage Processor 142 are both connected, such as a Peripheral Component Interconnect (PCI) or the like. As described further herein, a number of specific cluster flags located in Cluster Memory 151 may be associated with Secondary Storage Processor 142. Each cluster flag located in Cluster Memory 151 that is associated with Secondary Storage Processor 142 may be set and cleared by software executing in Secondary Storage Processor 142. The value of each cluster flag associated with Secondary Storage Processor 142 and located in Cluster Memory 151 (e.g. set or cleared) may be read by software executing in Primary Storage Processor 102. In this way, the contents of Cluster Memory 151 is mirrored from Secondary Storage Processor 142 to Primary Storage Processor 102.

During operation of some embodiments, mapped RAID (Redundant Array of Independent Disks) data storage virtualization is provided. In such embodiments, Drive Extent Pool 120 may be used by Host I/O Processing Logic 114 to store indications of multiple, equal size drive extents, each one of which consists of a physically contiguous range of non-volatile data storage located on a single data storage drive contained in Non-Volatile Data Storage Drives 104. For example, Host I/O Processing Logic 114 may divide each one of the data storage drives in the Non-Volatile Data Storage Drives 104 into equal size drive extents of physically contiguous non-volatile storage, and add an indication (e.g. a drive index, a drive extent index, etc.) of each one of the resulting drive extents to Drive Extent Pool 120. The size of the drive extents into which the physical drives are divided to provide mapped RAID is the same for every data storage drive. Various specific fixed sizes of drive extents may be used in different embodiments. For example, in some embodiments each drive extent may have a size of 10 gigabytes. Larger or smaller drive extent sizes may be used in alternative embodiments.

Drive extents are allocated by Host I/O Processing Logic 114 from Drive Extent Pool 120 to entries in the Mapping Table 118. Each entry in the Mapping Table 118 describes and may also be referred to as a RAID extent. The drive extents allocated to each individual RAID extent in the Mapping Table 118 may be used to store host data that is written to a corresponding portion of an address space of Primary Copy 116.

Primary Copy 116 is a copy of a storage object, such as a logical disk or "LUN", for which Primary Storage Processor 102 and Secondary Storage Processor 142 concurrently receive and process host I/O operations from Host Computer(s) 180. When host write I/O operations in Host I/O Operations 184 directed to the storage object are received and processed by Primary Storage Processor 102, the host data specified by the host write I/O operations is stored in Primary Copy 116.

With regard to Secondary Storage Processor 142, in embodiments that provide mapped RAID data storage virtualization, Drive Extent Pool 160 may be used by Host I/O Processing Logic 154 to store indications of multiple, equal size drive extents, each one of which consists of a physically contiguous range of non-volatile data storage located on a single data storage drive contained in Non-Volatile Data Storage Drives 144. Host I/O Processing Logic 154 may divide each one of the data storage drives in the Non-Volatile Data Storage Drives 144 into equal size drive extents of physically contiguous non-volatile storage, and add an indication (e.g. a drive index, a drive extent index, etc.) of each one of the resulting drive extents to Drive Extent Pool 160. Drive extents are allocated by Host I/O Processing Logic 154 from Drive Extent Pool 160 to entries in the Mapping Table 158. Each entry in the Mapping Table 158 describes and may be referred to as a RAID extent. The drive extents allocated to each individual RAID extent in the Mapping Table 158 are used to store host data that is written to a corresponding portion of an address space of Secondary Copy 156. Secondary Copy 156 is a copy of the storage object for which Primary Storage Processor 102 and Secondary Storage Processor 142 concurrently receive and process host I/O operations from Host Computer(s) 180. When host write I/O operations in the Host I/O Operations 184 directed to the storage object are received and processed by Secondary Storage Processor 142, the host data specified by the host write I/O operations is stored in Secondary Copy 156.

The drive extents indicated by each RAID extent in Mapping Table 118 and/or Mapping Table 158 are used to store the blocks of data and parity information for a stripe of data storage represented by the RAID extent. The specific number of drive extents indicated by each RAID extent may be the same as the number of disks used in a traditional RAID system to store data blocks and parity information for a given RAID level. For example, in a mapped RAID system supporting 4D+1P RAID-5, each RAID extent indicates a total of five drive extents that are used to store the four blocks of data as well as the parity information block of the stripe represented by the RAID extent. In another example, in a 4D+2P RAID-6 mapped RAID configuration, two parity information blocks are indicated by each RAID extent to provide an increased level of fault tolerance, and each RAID extent indicates a total of six drive extents.

By concurrently receiving and processing host I/O operations directed to a single storage object, Primary Storage Processor 102 and Secondary Storage Processor 142 allow for load balancing to be performed on the host I/O operations directed to the storage object. For example, a first set of host I/O operations 182 directed to the storage object may be received and processed by Primary Storage Processor 112, while a second set of host I/O operations 184 may be received and processed by Secondary Storage Processor 142, in order to spread the host I/O operations directed to the storage object evenly across Primary Storage Processor 112 and Secondary Storage Processor 142. Also by concurrently receiving and processing host I/O operations directed to the single storage object, Primary Storage Processor 102 and Secondary Storage Processor 142 provide a high level of availability with regard to the storage object, since host I/O operations directed to the storage object will continue to be received and processed even in the case where either Primary Storage Processor 102 or Secondary Storage Processor 142 fails or becomes unreachable.

Write Mirroring 186 may be performed between Primary Storage Processor 102 and Secondary Storage Processor 142, such that host write I/O operations directed to the storage object that are received and processed by Primary Storage Processor 102 are both performed by Host I/O Processing Logic 114 on the Primary Copy 116 of the storage object, and are also mirrored to Secondary Storage Processor 142 so that they are also performed by Host I/O Processing Logic 154 on the Secondary Copy 156 of the storage object. In this way, the storage object may be replicated on both Primary Storage Processor 102 and Secondary Storage Processor 142, further providing for seamless continuity of service in the case where either Primary Storage Processor 102 or Secondary Storage Processor 142 fails or becomes unreachable.

During operation of some embodiments, Event Processing Logic 112 operates to detect the occurrence of one or more events that require synchronized handing between the Primary Storage Processor 102 and the Secondary Storage Processor 142. Various specific types of events may be detected that require synchronized handling between the Primary Storage Processor 102 and the Secondary Storage Processor 142. Examples of such events that may be detected by Event Processing Logic 112 include, without limitation, failure of a data storage drive in Non-Volatile Data Storage Drives 104. In response to detecting each event that requires synchronized handling between the Primary Storage Processor 102 and the Secondary Storage Processor 142, Event Processing Logic 112 adds a task descriptor associated with the event to the Task Scheduling Queue 124. As a result, Task Scheduling Queue 124 may contain multiple Task Descriptors 126. The Task Scheduling Queue 124 is maintained only on the Primary Storage Processor 102.

Each one of the Task Descriptors 126 contained in the Task Scheduling Queue 124 indicates an ordered set of task states, and each task state is associated with a corresponding function that is one of a set of functions that are to be executed in response to detection of the event associated with the task descriptor.

Task Execution Engine 130 selects a single task descriptor at a time from the Task Scheduling Queue 126 for uninterrupted execution on both the Primary Storage Processor 102 and the Secondary Storage Processor 142. The current task descriptor selected for execution on both the Primary Storage Processor 112 and the Secondary Storage Processor 142 is referred to as the working task descriptor, and is shown for purposes of illustration by the working task descriptor WTD 128 in FIG. 1.

In some embodiments, each one of the Task Descriptors 126 in the Task Scheduling Queue 124 may indicate an associated priority. In such embodiments, Task Execution Engine 130 may select the working task descriptor WTD 128 from Task Scheduling Queue 124 based on the relative priorities indicated by the Task Descriptors 126, such that a task descriptor indicating an associated priority that is the highest priority of any of the associated priorities indicated by any task descriptor in Task Descriptors 126 is selected. Alternatively, or in addition, Task Scheduling Queue 124 may further operate as a first in first out (FIFO) data structure, such that earlier added task descriptors in Task Descriptors 126 are selected as the working task descriptor WTD 128 prior to later added task descriptors.

After selection of the working task descriptor WTD 128 by Task Execution Engine 130 for uninterrupted execution on both the Primary Storage Processor 112 and the Secondary Storage Processor 142, Task Execution Engine 130 transmits a copy of the working task descriptor WTD 128 from the Primary Storage Processor 102 to the Secondary Storage Processor 142, as shown for purposes of illustration in FIG. 1 by WTD Copy 168.

The working task descriptor WTD 128 is then executed on both the Primary Storage Processor 102 and the Secondary Storage Processor 142, by executing the working task descriptor WTD 128 using Task Execution Engine 130 on the Primary Storage Processor 102, and by executing WTD Copy 168 using Task Execution Engine 170 on the Secondary Storage Processor 142. Execution of the working task descriptor WTD 128 on both the Primary Storage Processor 102 and the Secondary Storage Processor 142 cannot be interrupted by execution of any other task descriptor. In this way, execution of the individual Task Descriptors 126 in the Task Scheduling Queue 124 is completely serialized.

Execution of the working task descriptor WTD 128 on both the Primary Storage Processor 102 and the Secondary Storage Processor 142 includes simultaneously transitioning through each one of the task states indicated by the working task descriptor WTD 128 on both the Primary Storage Processor 102 and the Secondary Storage Processor 142, one task state at a time, in the order of the task states indicated by the working task descriptor. During each one of the task states indicated by the working task descriptor WTD 128, the function associated with the task state is completely executed on both the Primary Storage Processor 102 and the Secondary Storage Processor 142. In this way, the synchronous execution of the functions in the set of functions that are to be executed on both Primary Storage Processor 102 and Secondary Storage Processor 142 in response to detection of the event associated with the working task descriptor WTD 128 is completely serialized. Examples of functions that may be associated with individual task states include, without limitation, i) stopping subsequent host I/O operations from being received and processed on Primary Storage Processor 102 and/or Secondary Storage Processor 142, ii) allocating storage on one or more of the remaining data storage drives to be used to replace the storage on a failed data storage drive in Non-Volatile Data Storage Drives 104 or Non-Volatile Data Storage Drives 144, iii) updating the contents of Mapping Table 118 and/or Mapping Table 158 to indicate newly allocated storage to be used to replace the storage from a failed drive, iv) restarting receipt and processing of host I/O operations on Primary Storage Processor 102 and/or Secondary Storage Processor 142, and v) rebuilding data from a failed drive onto newly allocated storage in Non-Volatile Data Storage Drives 104 and/or Non-Volatile Data Storage Drives 144 based on parity information stored on the remaining drives.

While the above describes embodiments in which mapped RAID is used to provide storage virtualization, the disclosed technology is not limited to embodiments that provide or support mapped RAID. Those skilled in the art will recognize that the disclosed technology may alternatively be embodied using traditional RAID storage virtualization, or without any RAID storage virtualization.

While for purposes of illustration FIG. 1 shows separate sets of non-volatile data storage drives communicably coupled to each of Primary Storage Processor 102 and Secondary Storage Processor 142, the disclosed technology is not limited to such embodiments. Alternatively, the disclosed technology may be embodied such that Primary Storage Processor 102 and Secondary Storage Processor 142 are communicably coupled to a single set of non-volatile data storage drives, e.g. a single array of non-volatile data storage drives that is shared by Primary Storage Processor 102 and Secondary Storage Processor 142.

While the above describes how Primary Copy 116 and Secondary Copy 156 of the storage object may be stored in different sets of drive extents, e.g. in which Primary Copy 116 is a copy of the storage object stored in a first set of drive extents allocated from Non-Volatile Data Storage Drives 104, and Secondary Copy 156 is a copy of the storage object stored in a second set of drive extents allocated from Non-Volatile Data Storage Drives 144, the disclosed technology is not limited to such embodiments. Alternatively, or in addition, Primary Copy 116 and Secondary Copy 156 may completely or partially be stored in a persistent cache. Such a persistent cache may be implemented in DRAM (Dynamic Random Access Memory). A DRAM persistent cache that stores Primary Copy 116 of the storage object may be located in the Primary Storage Processor 102, and a DRAM persistent cache that stores Secondary Copy 156 of the storage object may be located in the Secondary Storage Processor 142. The contents of the persistent cache may be backed up by battery, and may be mirrored between the Primary Storage Processor 102 and the Secondary Storage Processor 142 (e.g. as shown by Write Mirroring 186). In some embodiments, host write I/O operations directed to the storage object that are received and processed by Primary Storage Processor 102 may be acknowledged as completed to Host Computer(s) 180 upon successful storage of the write data into the Primary Copy 116 contained in the persistent cache located in Primary Storage Processor 102, and host write I/O operations directed to the storage object that are received and processed by Secondary Storage Processor 142 may be acknowledged as completed to Host Computer(s) 180 upon successful storage of the write data into the Secondary Copy 156 contained in the persistent cache located in Secondary Storage Processor 142. In such embodiments, the contents of the persistent cache in Primary Storage Processor 102 may be flushed to drive extents allocated from data storage drives in Non-Volatile Data Storage Drives 104, as indicated by RAID extents contained in Mapping Table 118, and the contents of the persistent cache in Secondary Storage Processor 142 may be flushed to drive extents allocated from data storage drives in the Non-Volatile Data Storage Drives 144, as indicated by RAID extents contained in Mapping Table 158. Alternatively, the contents of the persistent cache in both Primary Storage Processor 102 and Secondary Storage Processor 142 may be flushed to a single set of drive extents located on a single set of non-volatile data storage drives that is communicably coupled to both Primary Storage Processor 102 and Secondary Storage Processor 142.

Figure 2:
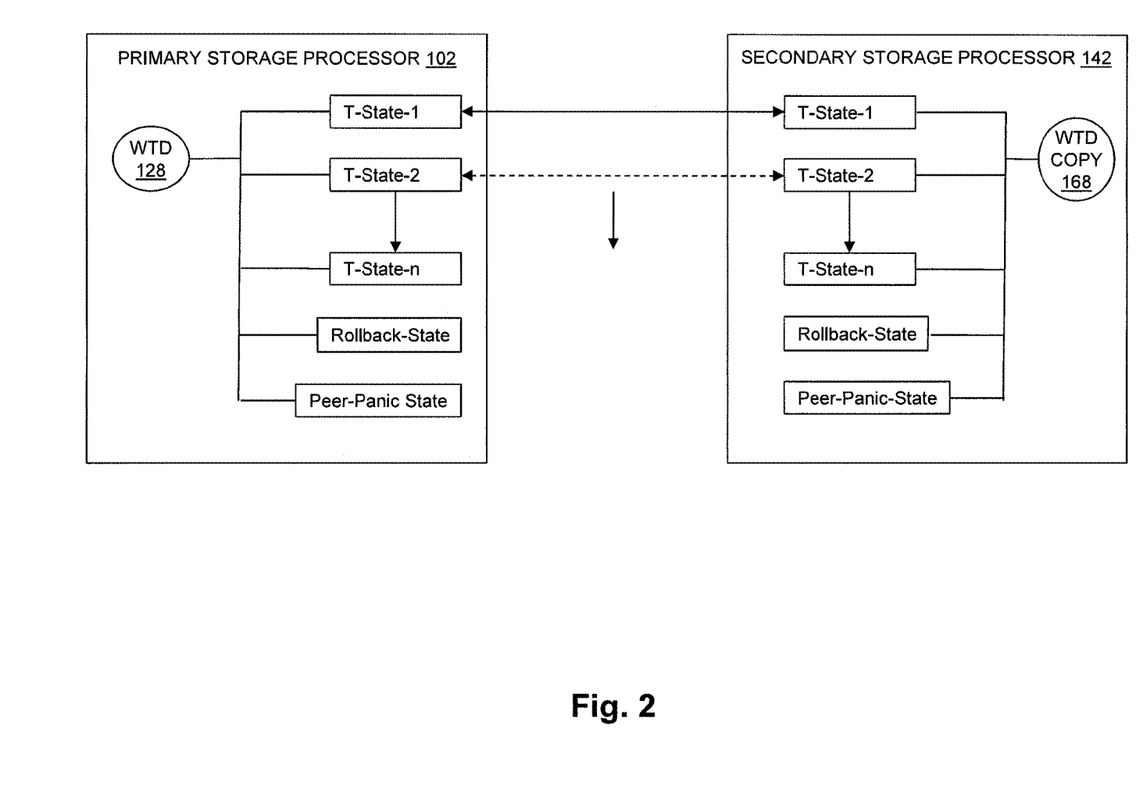
FIG. 2 is a block diagram showing an example of executing a working task descriptor on both the primary storage processor and the secondary storage processor in an active/active data storage system in some embodiments.

FIG. 2 is a block diagram showing an example of executing a working task descriptor on both the Primary Storage Processor 102 and the Secondary Storage Processor 142 in some embodiments. As shown in FIG. 2, in order to execute the working task descriptor WTD 128 on both the Primary Storage Processor 102 and the Secondary Storage Processor 142, the working task descriptor WTD 128 is executed on Primary Storage Processor 102, and a copy of the working task descriptor WTD Copy 168 is executed on the Secondary Storage Processor 142. The working task descriptor WTD 128 indicates an ordered set of "n" task states, e.g. T-State-1, T-State-2, and so on through T-State-n. During execution of the working task descriptor WTD 128, Primary Storage Processor 102 and Secondary Storage Processor 142 simultaneously transition through each one of the task states indicated by the working task descriptor WTD 128, one task state at a time, in the order of the task states indicated by the working task descriptor. During each one of the task states indicated by the working task descriptor WTD 128, the function associated with the task state is completely executed on both the Primary Storage Processor 102 and the Secondary Storage Processor 142. Accordingly, Primary Storage Processor 102 and Secondary Storage Processor 142 first both enter T-State-1. After Primary Storage Processor 102 and Secondary Storage Processor 142 have both entered T-State-1, Primary Storage Processor 102 and Secondary Storage Processor 142 both completely execute a function associated with T-State-1. When both Primary Storage Processor 102 and Secondary Storage Processor 142 have both completed the execution of the function associated with T-State-1, Primary Storage Processor 102 and Secondary Storage Processor 142 both exit T-State-1. After Primary Storage Processor 102 and Secondary Storage Processor 142 both leave T-State-1, Primary Storage Processor 102 and Secondary Storage Processor 142 both enter T-State-2. After both Primary Storage Processor 102 and Secondary Storage Processor 142 have both entered T-State-2, Primary Storage Processor 102 and Secondary Storage Processor 142 both completely execute a function associated with T-State-2. When both Primary Storage Processor 102 and Secondary Storage Processor 142 have both completed the execution of the function associated with T-State-2, Primary Storage Processor 102 and Secondary Storage Processor 142 both exited T-State-1. This process continues for all other task states in the ordered set of task states indicated by the working task descriptor WTD 128, until both Primary Storage Processor 102 and Secondary Storage Processor 142 have both exited task state n, at which point execution of the working task descriptor 128 is completed on both the Primary Storage Processor 102 and the Secondary Storage Processor 142, and a next working task descriptor can be selected from the Task Scheduling Queue 124 for execution on both Primary Storage Processor 102 and Secondary Storage Processor 142.

Working task descriptor WTD 128 also indicates a Rollback-State. The Rollback-State is entered by both Primary Storage Processor 102 and Secondary Storage Processor 142 in response to a failure being detected on Primary Storage Processor 102 or Secondary Storage Processor 142 during execution of any function associated with any of the task states in the ordered set of task states T-State-1 through T-State-n indicated by the working task descriptor WTD 128 during execution of the working task descriptor WTD 128. At the time a failure is detected, a failure point at which the failure was detected is recorded. Such a recorded failure point may, for example, indicate a specific execution point (e.g. the specific task state) during which the failure was detected. When the Primary Storage Processor 102 and the Secondary Storage Processor 142 both enter the Rollback-State, a function associated with the Rollback-State is executed on both the Primary Storage Processor 102 and the Secondary Storage Processor 142. The function associated with the Rollback-State may, for example, operate to perform various actions based on the specific recorded failure point, such as clearing any specific cluster flags that were set prior to detection of the failure. After the execution of the function associated with the Rollback-State is complete on both the Primary Storage Processor 102 and the Secondary Storage Processor 142, execution of the working task descriptor 128 is completed on both the Primary Storage Processor 102 and the Secondary Storage Processor 142, and a next working task descriptor can be selected from the Task Scheduling Queue 124 for execution on both Primary Storage Processor 102 and Secondary Storage Processor 142.

Working task descriptor WTD 128 also indicates a Peer-Panic State. The Peer-Panic State is entered by either Primary Storage Processor 102 or Secondary Storage Processor 142 in response to a failure of the other storage processor during execution of the working task descriptor WTD 128. Accordingly, Primary Storage Processor 102 automatically enters the Peer-Panic State in response to detection of a failure of the Secondary Storage Processor 142 while executing the working task descriptor WTD 128, and Secondary Storage Processor 142 enters the Peer-Panic State in response to detecting a failure of the Primary Storage Processor 102 while executing the working task descriptor WTD 128. At the time the storage processor failure is detected, a panic point at which the failure was detected is recorded. Such a recorded failure point may, for example, indicate a specific execution point (e.g. the specific task state) at which the failure was detected. When either Primary Storage Processor 102 or the Secondary Storage Processor 142 enter the Peer-Panic State, a peer panic function associated with the Peer-Panic State is executed. The peer panic function associated with the Peer-Panic State may, for example, operate to respond to the failure of the other storage processor by i) continuing execution of the working task descriptor WTD 128 from the recorded panic point, ii) restarting execution of the working task descriptor WTD 128 from the first task state in the task states indicated by working task descriptor WTD 128, or iii) immediately terminating execution of the working task descriptor WTD 128, such that execution of the working task descriptor WTD 128 is considered complete on both the Primary Storage Processor 102 and the Secondary Storage Processor 142, and a next working task descriptor can be selected from the Task Scheduling Queue 124 for execution on both Primary Storage Processor 102 and Secondary Storage Processor 142.

Figure 3:
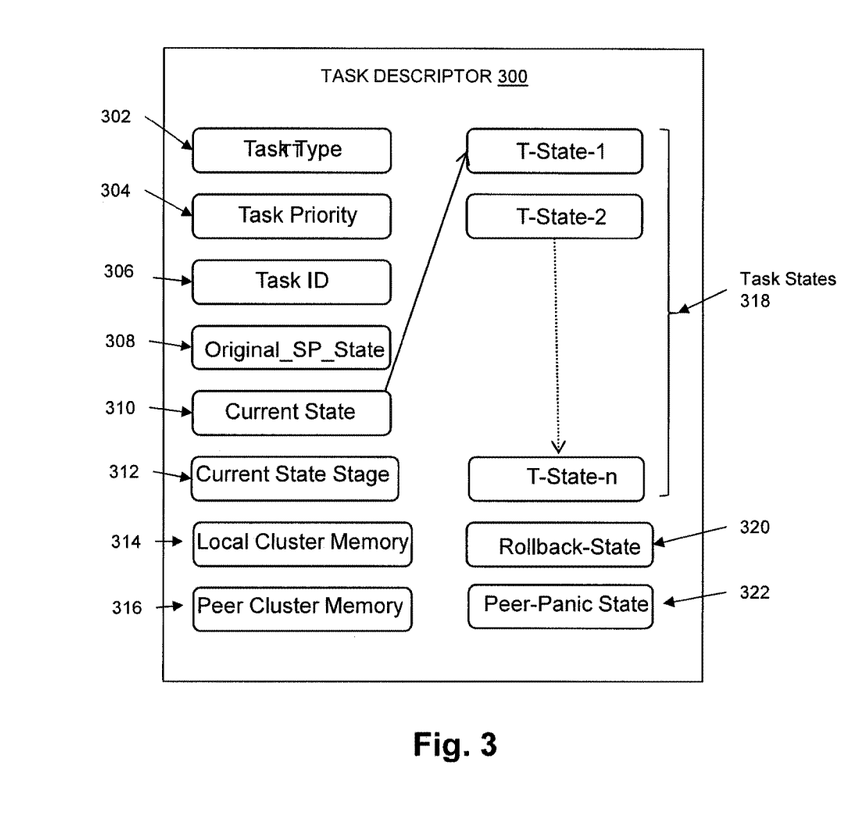
FIG. 3 is a block diagram showing an example of the format of a task descriptor in some embodiments.

FIG. 3 is a block diagram showing an example of the contents of a Task Descriptor 300 in some embodiments. As shown in FIG. 3, Task Descriptor 300 may include a Task Type 302, which stores an indication of the type of the Task Descriptor 300. Task Priority 304 stores an indication of the priority of the Task Descriptor 300 (e.g. High, Medium, Low). Task ID 306 stores a unique identifier for the Task Descriptor 300.

Original_SP_State 308 stores an indication of the original state of the storage processor on which execution of Task Descriptor 300 was initiated, for use by the peer panic function associated with the Peer-Panic State to determine whether the current state of the storage processor on which Task Descriptor 300 is executing after a failure of the other storage processor is the same as the state of the original storage processor on which execution of the Task Descriptor 300 was initiated. For example, when Task Execution Engine 130 selects Task Descriptor 300 as the working task descriptor for execution, Task Execution Engine 130 stores a value of "PRIMARY" or the like into Original_SP_State 308, indicating that execution of Task Descriptor 300 was initiated on a primary storage processor, e.g. Primary Storage Processor 102. Similarly, when Task Execution Engine 170 loads a copy of Task Descriptor 300 for execution, Task Execution Engine 170 stores a value of "SECONDARY" or the like into Original_SP_State 308, indicating that execution of the copy of Task Descriptor 300 was initiated on a secondary storage processor, e.g. Secondary Storage Processor 142. In the event that a storage processor fails during execution of Task Descriptor 300, the state of the storage processor on which Task Descriptor 300 is executing may change, e.g. from secondary to primary. For example, if Primary Storage Processor 102 fails during execution of Task Descriptor 300, Secondary Storage Processor 142 will immediately become a primary storage processor, but a peer panic function associated with the Peer-Panic State executing on Secondary Storage Processor 142 will be able to determine that Secondary Storage Processor 102 has recently become a primary storage processor, based on finding the value of "SECONDARY" in Original_SP_State 308. Accordingly, the peer panic function associated with the Peer-Panic State can determine that certain actions should be performed in response to detecting that Secondary Storage Processor 142 has changed into a primary storage processor. For example, such actions may include creating a new task scheduling queue that is to be used on Secondary Storage Processor 142, now that Secondary Storage Processor 142 has become a primary storage processor in response to the failure of Primary Storage Processor 102, and since the only copy of Task Scheduling Queue 124 may have been lost when Primary Storage Processor 102 failed.

Current State 310 is used to store an indication of the current task state during execution of Task Descriptor 300. For example, Current State 310 may indicate a current one of the ordered set of Task States 318 that are indicated by Task Descriptor 300, e.g. one of the set of task states including T-State-1, T-State-2, and so on through T-State-n.

Current State Stage 312 is used to store an indication of a current stage of the current state indicated by Current State 310 during execution of the Task Descriptor 300. For example, in some embodiments, each task state transitions through a sequence of three stages:
SYNCING
STARTED, and
DONE or FAILURE Local Cluster Memory 314 stores a pointer or offset indicating a region of cluster memory in the storage processor on which Task Descriptor 300 is executing that is available to store cluster flags. For example, in the case where Task Descriptor 300 is executing on Primary Storage Processor 102, Local Cluster Memory 314 stores a pointer or offset into Cluster Memory 111 indicating a region within Cluster Memory 111 in which cluster flags are set and cleared by Primary Storage Processor 102. In the case where Task Descriptor 300 is executing on Secondary Storage Processor 142, Local Cluster Memory 314 stores a pointer or offset into Cluster Memory 151 indicating a region within Cluster Memory 151 in which cluster flags are stored that are set and cleared by Secondary Storage Processor 142.

Peer Cluster Memory 316 stores a pointer or offset indicating a region of cluster memory in the peer storage processor to the storage processor on which Task Descriptor 300 is executing that stores cluster flags that are set and cleared by the peer storage processor. For example, in the case where Task Descriptor 300 is executing on Primary Storage Processor 102, Peer Cluster Memory 316 stores a pointer or offset into Cluster Memory 151 indicating a region within Cluster Memory 151 in which cluster flags are stored that are set and cleared by Secondary Storage Processor 142. In the case where Task Descriptor 300 is executing on Secondary Storage Processor 142, Peer Cluster Memory 316 stores a pointer or offset into Cluster Memory 111 indicating a region within Cluster Memory 111 in which cluster flags can be stored that are set and cleared by Primary Storage Processor 102.

Task States 318 indicates an ordered set of task states T-State-1, T-State-2, and so on through T-State-n. Each one of the task states in Task States 318 may include an indication of an associated function that corresponds to that task state. The functions indicated by the task states in Task States 318 are a set of functions that are to be executed in response to detection of the event associated with the Task Descriptor 300.

Rollback-State 320 indicates a state that is entered in response to a failure being detected on during execution of Task Descriptor 300, e.g. during execution of any function associated with any of the task states in the ordered set of Task States 318. Rollback-State 320 also indicates an associated rollback function that corresponds to the Rollback-State 320 and that is executed in response to a failure being detected on during execution of Task Descriptor 300, e.g. during Rollback-State 320.

Peer-Panic State 322 indicates a state that is entered in response to detecting the failure of a peer storage processor during execution of the Task Descriptor 300, e.g. during execution of any function associated with any of the task states in the ordered set of Task States 318. Peer-Panic State 322 also indicates a peer-panic function that corresponds to the Peer-Panic State 322 and that is executed in response to failure of a storage processor, e.g. during the Peer-Panic State 322.

Figure 4:
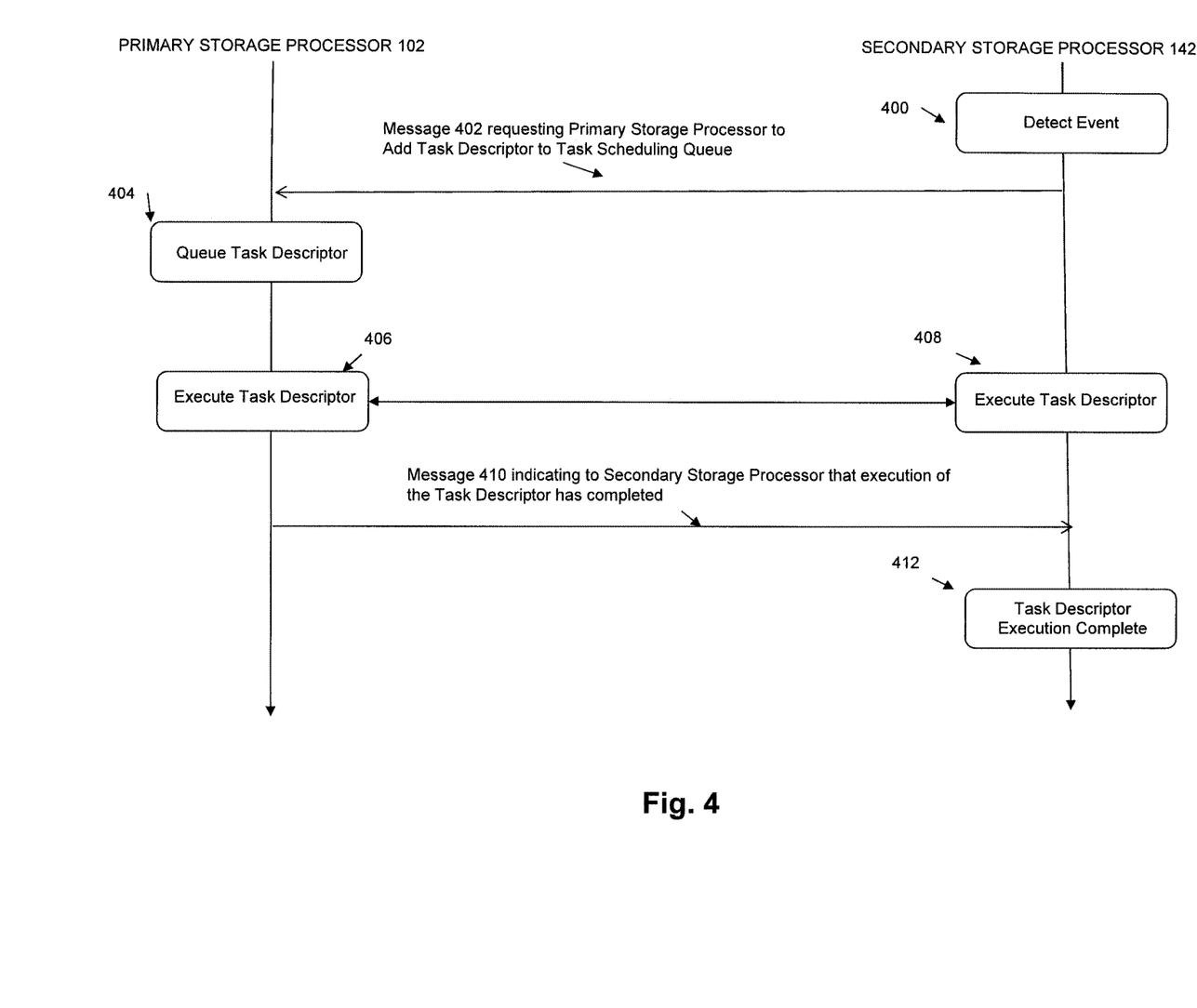
FIG. 4 is a sequence diagram showing an example of operation of a primary storage processor and a secondary storage processor in an active/active data storage system when handling an event detected on the secondary storage processor in some embodiments.

FIG. 4 is a sequence diagram showing an example of operation of Primary Storage Processor 102 and Secondary Storage Processor 142 when handling an event detected on the secondary storage processor. Since Task Scheduling Queue 124 is only maintained on Primary Storage Processor 102, when an event is detected on Primary Storage Processor 102 (e.g. failure of a drive in Non-Volatile Data Storage Drives 104), a task descriptor associated with the detected event and indicating the set of functions that are to be executed in response to detection of the event can be added directly to Task Scheduling Queue 124 by Event Processing Logic 112. However, in the case where an event is detected on Secondary Storage Processor 102 (e.g. failure of a drive in Non-Volatile Data Storage Drives 144), the steps of FIG. 4 must be performed.

At step 400, an event is detected by Secondary Storage Processor 142, such as failure of a drive in Non-Volatile Data Storage Drives 144. A Message 402 is then sent from Secondary Storage Processor 142 to Primary Storage Processor 102 requesting that Primary Storage Processor 102 add a task descriptor that is associated with the event and that indicates a set of functions that are to be executed in response to detection of the event to Task Scheduling Queue 124. The Message 402 may, for example, contain the task descriptor that is associated with the event and that indicates a set of functions that are to be executed in response to detection of the event.

Primary Storage Processor 102 receives the Message 402, and at 404, in response to receipt of the Message 402 adds the task descriptor that is associated with the event that was detected on Secondary Storage Processor 142, and that indicates a set of functions that are to be executed in response to detection of the event, to the Task Scheduling Queue 124 in the Primary Storage Processor 102.

The Task Execution Engine 130 subsequently selects the task descriptor that was added at 404 to the Task Scheduling Queue 124 as the working task descriptor, for simultaneous execution on both the Primary Storage Processor 102 and the Secondary Storage Processor 144, as shown at 406 and 408 in FIG. 4. After execution of the task descriptor on both the Primary Storage Processor 102 and the Secondary Storage Processor 142 has completed, Primary Storage Processor 102 sends a message 410 to Secondary Storage Processor 142 indicating that execution of the task descriptor has completed. In response to receipt of the Message 410, at 412 Secondary Storage Processor 142 records an indication that execution of the task descriptor has completed.

Figure 5:
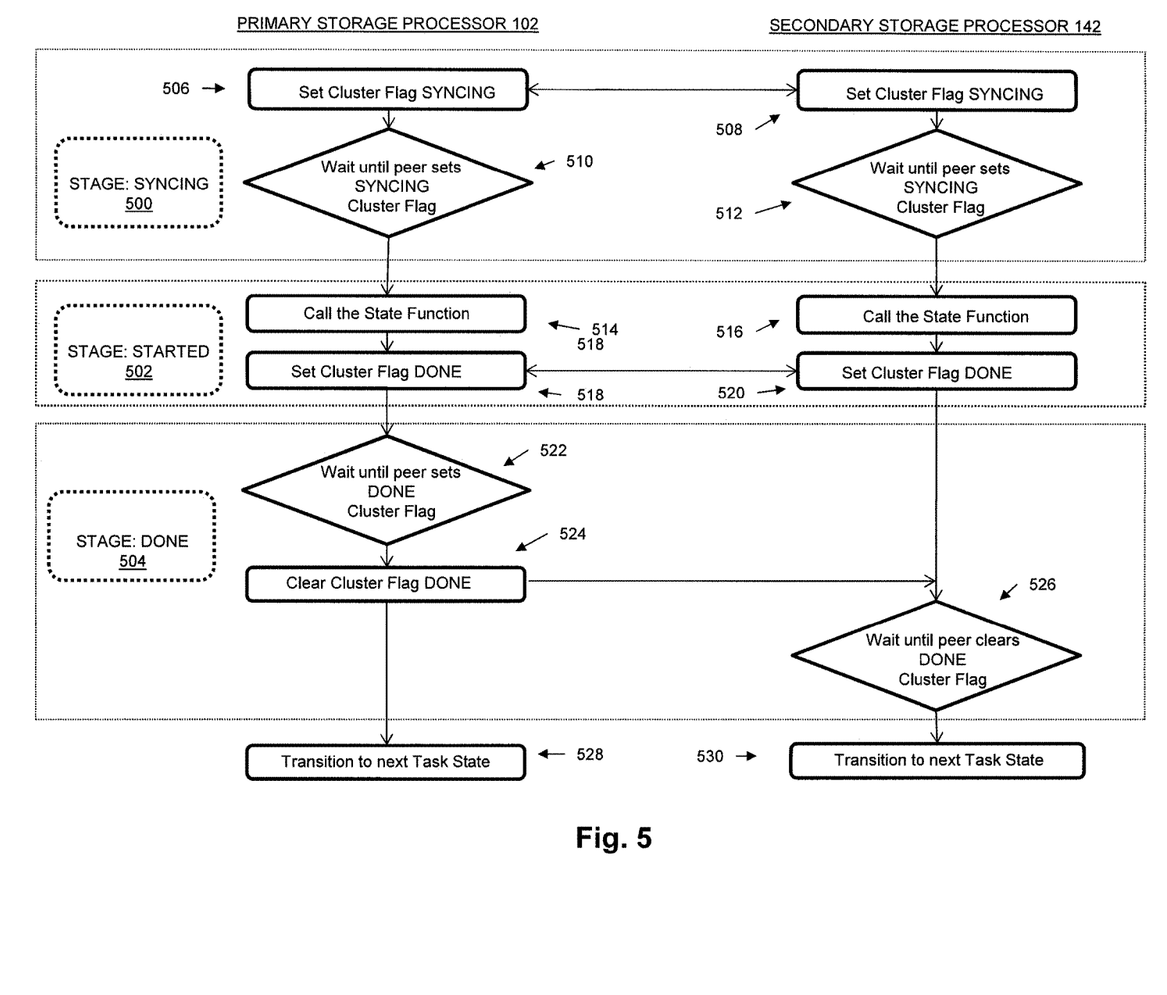
FIG. 5 is a sequence diagram showing an example of transitioning through a task state on both the primary storage processor and the secondary storage processor of an active/active data storage system and executing a function associated with the task state on both the primary storage processor and the secondary storage processor in some embodiments.

FIG. 5 is a sequence diagram showing an example of simultaneously transitioning through an individual task state of a task descriptor on both the Primary Storage Processor 102 and the Secondary Storage Processor 142, and executing a function associated with the task state on both the Primary Storage Processor 102 and the Secondary Storage Processor 142, under non-failure conditions. As shown in the example of FIG. 5, in some embodiments, under non-failure conditions, the Primary Storage Processor 102 and the Secondary Storage Processor 142 need to each allocate and use only two cluster flags (SYNCHING and DONE) to synchronize three sequential stages of processing when simultaneously transitioning through each individual task state indicated by a task descriptor on both the Primary Storage Processor 102 and the Secondary Storage Processor 142. The SYNCHING and DONE cluster flags on both the Primary Storage Processor 102 and the Secondary Storage Processor 142 may be re-used for each task state indicated by a selected task descriptor, because the disclosed technology serializes the processing of the individual task states indicated by the task descriptor, and also serializes the execution of individual task descriptors. As a result, only two cluster flags are required to be allocated and used by each of the Primary Storage Processor 102 and the Secondary Storage Processor 142 in order to simultaneously transition through each individual task state indicated by a task descriptor on both Primary Storage Processor 102 and Secondary Storage Processor 142.

Both the Primary Storage Processor 102 and the Secondary Storage Processor 142 start in the SYNCHING stage 500. In the SYNCHING stage 500, the Primary Storage Processor 102 sets its SYNCHING cluster flag at 506, e.g. in Cluster Memory 111, and at 508 the Secondary Storage Processor 142 sets its SYNCHING cluster flag, e.g. in Cluster Memory 151. The Primary Storage Processor 102 waits at 510 for the Secondary Storage Processor 142 to set its SYNCHING cluster flag, and the Secondary Storage Processor 142 waits at 512 for Primary Storage Processor 102 to set its SYNCHING cluster flag.

After Primary Storage Processor 102 detects that Secondary Storage Processor 142 has set its SYNCHING cluster flag, and the Secondary Storage Processor 142 detects that Primary Storage Processor 102 has set its SYNCHING cluster flag, both the Primary Storage Processor 102 and the Secondary Storage Processor 142 enter the STARTED stage 502. In the STARTED stage 502, both the Primary Storage Processor 102 and the Secondary Storage Processor 142 execute the function associated with the task state, as shown at 514 at which the Primary Storage Processor 102 executes the function associated with the task state, and at 516 at which the Secondary Storage Processor 142 executes the function associated with the task state. When the execution of the function associated with the task state completes successfully on the Primary Storage Processor 102, the Primary Storage Processor 102 sets its DONE cluster flag at 518, e.g. in Cluster Memory 111. When the execution of the function associated with the task state completes successfully on the Secondary Storage Processor 142, the Secondary Storage Processor 142 sets its DONE cluster flag at 520, e.g. in Cluster Memory 151.

After Primary Storage Processor 102 and Secondary Storage Processor 142 have set their DONE cluster flags, both the Primary Storage Processor 102 and the Secondary Storage Processor 142 enter the DONE stage 504. At 522 Primary Storage Processor 102 waits until Secondary Storage Processor 142 has set its DONE cluster flag. When Primary Storage Processor 102 detects that Secondary Storage Processor 142 has set its DONE cluster flag, at 524 Primary Storage Processor 102 clears its DONE cluster flag, and transitions to the next task state at 528. At 526 Secondary Storage Processor 142 waits until Primary Storage Processor 102 has cleared its DONE cluster flag. When Secondary Storage Processor 142 detects that Primary Storage Processor 102 has cleared its DONE cluster flag, Secondary Storage Processor 142 transitions to the next task state at 530.

Figure 6:
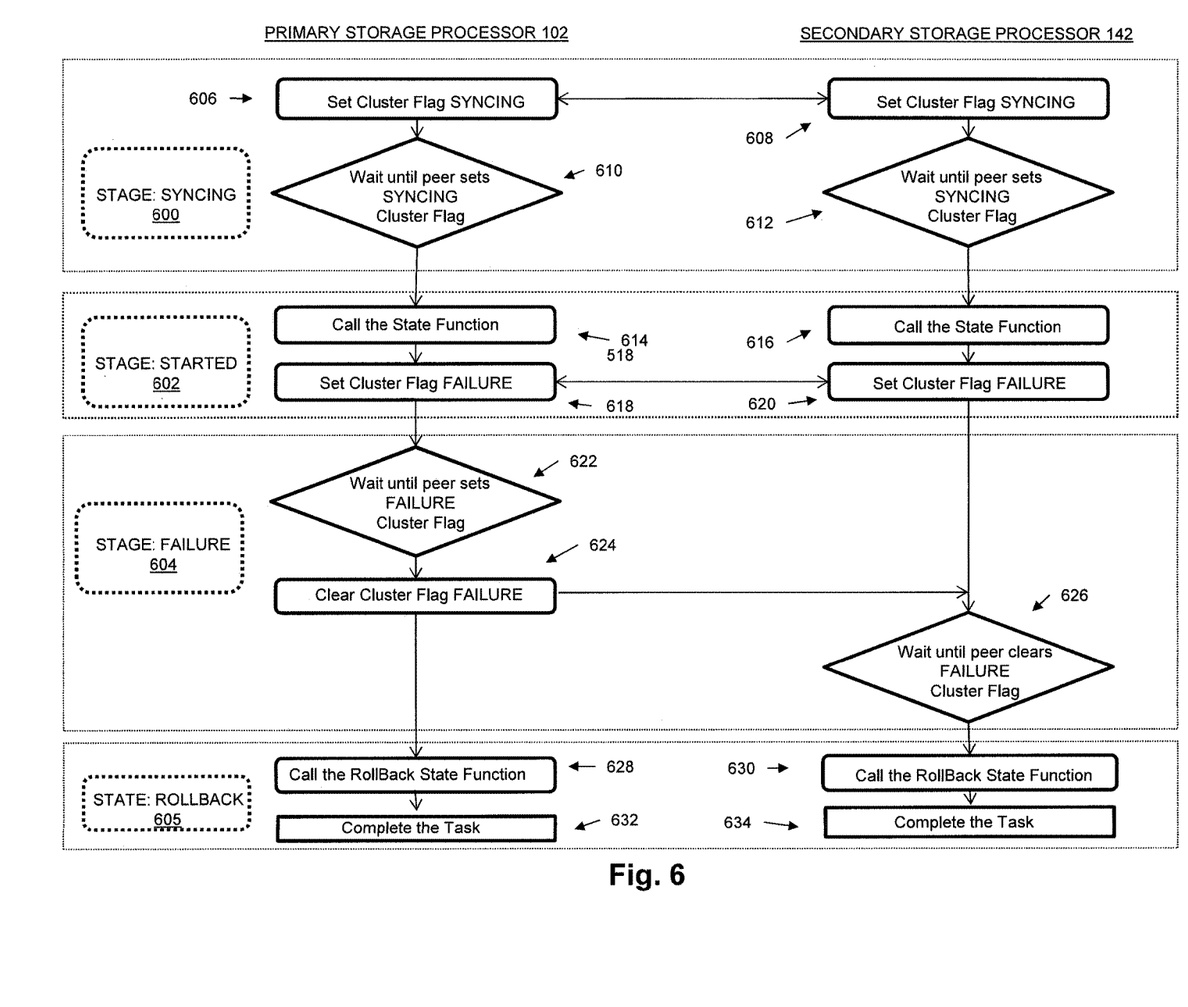
FIG. 6 is a sequence diagram showing an example of executing a rollback function associated with a task descriptor on both the primary storage processor and the secondary storage processor in response to a failure occurring during execution of the task descriptor.

FIG. 6 is a sequence diagram showing an example of transitioning through a task state of a task descriptor on both the Primary Storage Processor 102 and the Secondary Storage Processor 142, and executing a function associated with the task state on both the Primary Storage Processor 102 and the Secondary Storage Processor 142, under a failure condition, i.e. when a failure is detected while executing a function associated with a task state. As shown in the example of FIG. 6, in some embodiments each one of the Primary Storage Processor 102 and the Secondary Storage Processor 142 must allocate only one additional cluster flag (FAILURE) to additionally support transition through the FAILURE stage under failure conditions using the disclosed technology.

Both the Primary Storage Processor 102 and the Secondary Storage Processor 142 start in the SYNCHING stage 600. In the SYNCHING stage 600, the Primary Storage Processor 102 sets its SYNCHING cluster flag at 606, e.g. in Cluster Memory 111, and at 608 the Secondary Storage Processor 142 sets its SYNCHING cluster flag, e.g. in Cluster Memory 151. The Primary Storage Processor 102 waits at 610 for the Secondary Storage Processor 142 to set its SYNCHING cluster flag, and the Secondary Storage Processor 142 waits at 612 for Primary Storage Processor 102 to set its SYNCHING cluster flag.

After Primary Storage Processor 102 detects that Secondary Storage Processor 142 has set its SYNCHING cluster flag, and the Secondary Storage Processor 142 detects that Primary Storage Processor 102 has set its SYNCHING cluster flag, both the Primary Storage Processor 102 and the Secondary Storage Processor 142 enter the STARTED stage 602. In the STARTED stage 602, both the Primary Storage Processor 102 and the Secondary Storage Processor 142 execute the function associated with the task state, as shown at 614 at which the Primary Storage Processor 102 executes the function associated with the task state, and at 616 at which the Secondary Storage Processor 142 executes the function associated with the task state. When a failure is detected during the execution of the function associated with the task state on the Primary Storage Processor 102, the Primary Storage Processor 102 sets its FAILURE cluster flag at 618, e.g. in Cluster Memory 111. When the failure is detected during the execution of the function associated with the task state on the Secondary Storage Processor 142, the Secondary Storage Processor 142 sets its FAILURE cluster flag at 620, e.g. in Cluster Memory 151.

After Primary Storage Processor 102 and Secondary Storage Processor 142 have set their FAILURE cluster flags, both the Primary Storage Processor 102 and the Secondary Storage Processor 142 enter the FAILURE stage 604. At 622 Primary Storage Processor 102 waits until Secondary Storage Processor 142 has set its FAILURE cluster flag. When Primary Storage Processor 102 detects that Secondary Storage Processor 142 has set its FAILURE cluster flag, at 624 Primary Storage Processor 102 clears its FAILURE cluster flag, and transitions to the ROLLBACK state 605. At 626 Secondary Storage Processor 142 waits until Primary Storage Processor 102 has cleared its FAILURE cluster flag. When Secondary Storage Processor 142 detects that Primary Storage Processor 102 has cleared its FAILURE cluster flag, Secondary Storage Processor 142 transitions to the ROLLBACK state 605. At 628 the Primary Storage Processor 102 executes a function associated with ROLLBACK state 605, and at 630 the Secondary Storage Processor 142 executes the function associated with the ROLLBACK state 605. After execution of the function associated with the ROLLBACK state 605 is completed on the Primary Storage Processor 102, execution of the task on Primary Storage Processor 102 may be completed at 632. After execution of the function associated with the ROLLBACK state 605 is completed on the Secondary Storage Processor 142, execution of the task on Secondary Storage Processor 142 may be completed at 634.

Figure 7:
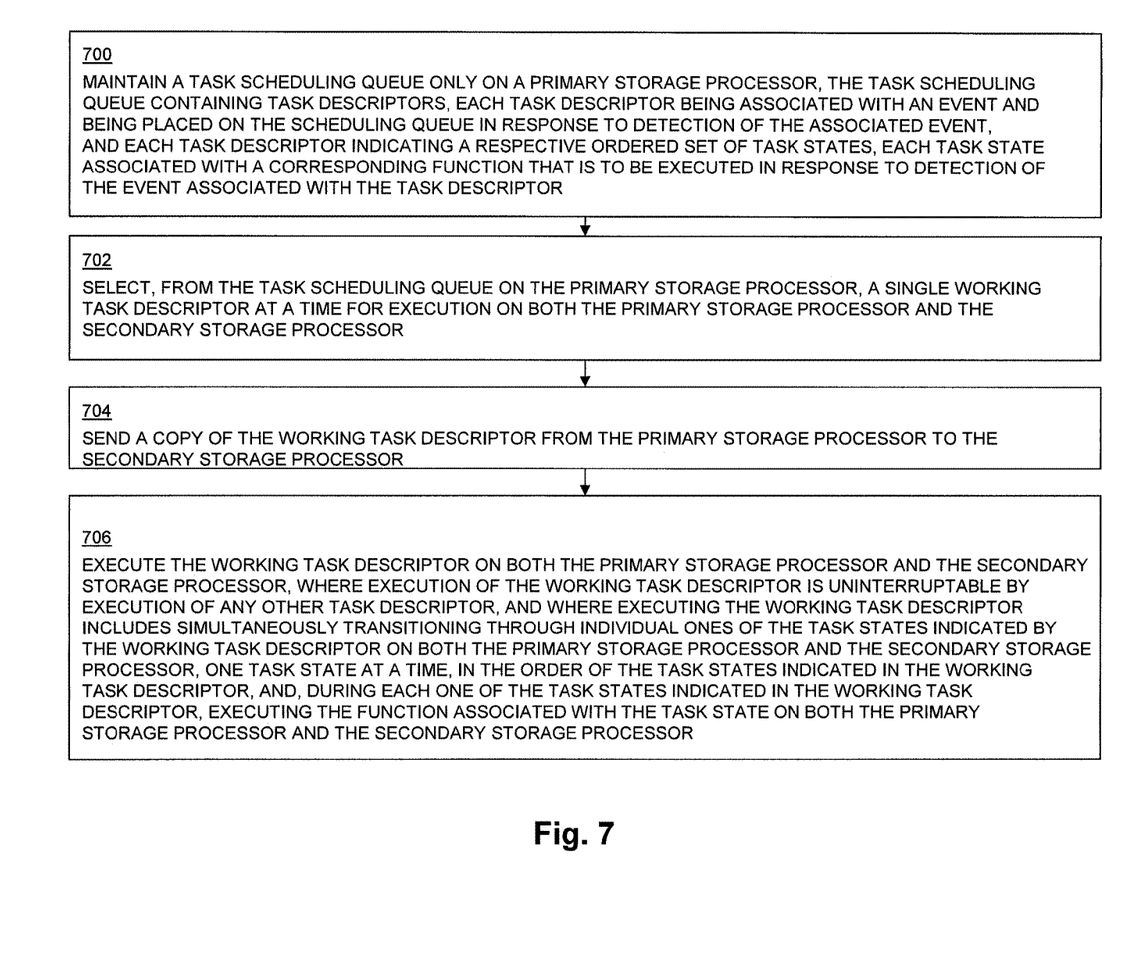
FIG. 7 is a flow chart showing an example of steps performed during operation of some embodiments.

FIG. 7 is a flow chart showing an example of steps performed during operation of some embodiments. The steps of FIG. 7 may, for example, be performed in whole or in part by the Event Processing Logic 112 and Event Processing Logic 152 shown in FIG. 1.

At 700 a task scheduling queue is maintained on only the primary storage processor of an active/active data storage system that includes both the primary storage processor and a secondary storage processor. The task scheduling queue maintained on the primary storage processor contains multiple task descriptors. Each task descriptor contained in the task scheduling queue is associated with an event, and placed on the scheduling queue in response to detection of the associated event. Each task descriptor indicates a respective ordered set of task states. Each task state in the ordered set of task states indicated by a task descriptor is associated with a corresponding function that is to be executed in response to detection of the event that is associated with that task descriptor.

At 702 a single working task descriptor is selected at a time from the task scheduling queue on the primary storage processor for uninterrupted execution on both the primary storage processor and the secondary storage processor.

At 704 a copy of the working task descriptor is sent from the primary storage processor to the secondary storage processor.

At 706 the working task descriptor is executed on both the primary storage processor and the secondary storage processor, where execution of the working task descriptor is uninterruptable by execution of any other task descriptor, and where executing the working task descriptor includes simultaneously transitioning through individual ones of the task states indicated by the working task descriptor on both the primary storage processor and the secondary storage processor, one task state at a time, in the order of the task states indicated in the working task descriptor, and, during each one of the task states indicated in the working task descriptor, executing the function associated with the task state on both the primary storage processor and the secondary storage processor.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, without limitation, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms, including without limitation: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of synchronizing event handling between a primary storage processor and a secondary storage processor in an active/active data storage system, comprising:

maintaining a task scheduling queue only on the primary storage processor, wherein the task scheduling queue contains a plurality of task descriptors, wherein each task descriptor is associated with an event and is placed on the scheduling queue in response to detection of the associated event, wherein each task descriptor indicates an ordered set of task states, wherein each one of the task states is associated with a respective one of a plurality of functions that are to be executed in response to detection of the associated event;

selecting, from the task scheduling queue on the primary storage processor, a single working task descriptor at a time for execution on both the primary storage processor and the secondary storage processor;

sending a copy of the working task descriptor from the primary storage processor to the secondary storage processor; and executing the working task descriptor on both the primary storage processor and the secondary storage processor, wherein execution of the working task descriptor is uninterruptable by execution of any other task descriptor, and wherein executing the working task descriptor includes simultaneously transitioning through individual ones of the task states indicated by the working task descriptor on both the primary storage processor and the secondary storage processor, one task state at a time, in the order of the task states indicated in the working task descriptor, and, during each one of the task states indicated in the working task descriptor, executing the function associated with the task state on both the primary storage processor and the secondary storage processor.

2. The method of claim 1, wherein simultaneously transitioning through each individual one of the task states indicated by the working task descriptor on both the primary storage processor and the secondary storage processor, under non-failure conditions, comprises simultaneously transitioning through a synching stage, a started stage, and a done stage on both the primary storage processor and the secondary storage processor for each individual one of the task states indicated by the working task descriptor.

3. The method of claim 2, wherein the primary storage processor and the secondary storage processor simultaneously transition through the synching stage, the started stage, and the done stage for each individual one of the task states indicated by the working task descriptor using a synching cluster flag and a done cluster flag on the primary storage processor and a synching cluster flag and a done cluster flag on the secondary storage processor.

4. The method of claim 3, wherein executing the function associated with the task state on both the primary storage processor and the secondary storage processor during each one of the task states indicated in the working task descriptor comprises executing the function associated with the task state during the started stage on both the primary storage processor and the secondary storage processor.

5. The method of claim 1, further comprising
wherein each task descriptor contained in the task scheduling queue further indicates a rollback function to be executed on both the primary storage processor and the secondary storage processor in response to detecting a failure while executing the task descriptor; and in response to detecting a failure while executing a function associated with one of the task states indicated by the working task descriptor, executing a rollback function indicated by the working task descriptor on both the primary storage processor and the secondary storage processor.

6. The method of claim 5, further comprising:
wherein each task descriptor contained in the task scheduling queue further indicates a peer panic function to be executed in response to detecting a failure of either the primary storage processor or the secondary storage processor; and in response to detecting a failure of the primary storage processor while executing the working task descriptor, executing a peer panic function indicated by the working task descriptor on the secondary storage processor.

7. The method of claim 5, further comprising:
wherein each task descriptor contained in the task scheduling queue further indicates a peer panic function to be executed in response to detecting a failure of either the primary storage processor or the secondary storage processor; and in response to detecting a failure of the secondary storage processor while executing the working task descriptor, executing a peer panic function indicated by the working task descriptor on the primary storage processor.

8. The method of claim 1, further comprising:
in response to detecting an event on the secondary storage processor, sending a message from the secondary storage processor to the primary storage processor that contains a task descriptor associated with the event detected on the secondary storage processor;

in response to receipt by the primary storage processor of the message that contains the task descriptor associated with the event detected on the secondary storage processor, adding, by the primary storage processor, the task descriptor associated with the event detected on the secondary storage processor to the task scheduling queue maintained only on the primary storage processor; and subsequently selecting the task descriptor associated with the event detected on the secondary storage processor from the task scheduling queue as a working task descriptor for execution on both the primary storage processor and the secondary storage processor.

9. The method of claim 1, wherein both the primary storage processor and the secondary storage processor receive and process host write I/O operations directed to a storage object; and wherein both the primary storage processor and the secondary storage processor store host data written to the storage object into non-volatile storage located on one or more non-volatile data storage drives.

10. The method of claim 1, wherein both the primary storage processor and the secondary storage processor receive and process host write I/O operations directed to a storage object; and wherein both the primary storage processor and the secondary storage processor store host data written to the storage object into at least one persistent cache.

11. The method of claim 1, wherein host data written to the storage object by host write I/O operations received and processed by the primary storage processor is stored by the primary storage processor in a primary copy of the storage object that is maintained by the primary storage processor, and is also mirrored to the secondary storage processor for the secondary storage processor to store in a secondary copy of the storage object that is maintained by the secondary storage processor; and wherein host data written to the storage object by host write I/O operations received and processed by the secondary storage processor is stored by the secondary storage processor in the secondary copy of the storage object that is maintained by the secondary storage processor, and is also mirrored to the primary storage processor for the primary storage processor to store in the primary copy of the storage object that is maintained by the primary storage processor.

12. An active/active data storage system, comprising:
a primary storage processor including processing circuitry and a memory having program code stored thereon;
a secondary storage processor including processing circuitry and a memory having program code stored thereon;
wherein the program code stored in the memory of the primary storage processor and the memory of the secondary storage processor, when executed by the processing circuitry in the primary storage processor and the processing circuitry in the secondary storage processor, causes the processing circuitry in the primary storage processor and the processing circuitry in the secondary storage processor to:
   maintain a task scheduling queue only on the primary storage processor, wherein the task scheduling queue contains a plurality of task descriptors, wherein each task descriptor is associated with an event and is placed on the scheduling queue in response to detection of the associated event, wherein each task descriptor indicates an ordered set of task states, wherein each one of the task states is associated with a respective one of a plurality of functions that are to be executed in response to detection of the associated event,
   select, from the task scheduling queue on the primary storage processor, a single working task descriptor at a time for execution on both the primary storage processor and the secondary storage processor,
   send a copy of the working task descriptor from the primary storage processor to the secondary storage processor, and
   execute the working task descriptor on both the primary storage processor and the secondary storage processor, wherein execution of the working task descriptor is uninterruptable by execution of any other task descriptor, and wherein executing the working task descriptor includes simultaneously transitioning through individual ones of the task states indicated by the working task descriptor on both the primary storage processor and the secondary storage processor, one task state at a time, in the order of the task states indicated in the working task descriptor, and, during each one of the task states indicated in the working task descriptor, executing the function associated with the task state on both the primary storage processor and the secondary storage processor.

13. The active/active data storage system of claim 12, wherein the program code stored in the memory of the primary storage processor and the memory of the secondary storage processor, when executed by the processing circuitry in the primary storage processor and the processing circuitry in the secondary storage processor, further causes the processing circuitry in the primary storage processor and the processing circuitry in the secondary storage processor to simultaneously transition the primary storage processor and the secondary storage processor through each individual one of the task states indicated by the working task descriptor, under non-failure conditions, by causing the primary storage processor and the secondary storage processor to simultaneously transition through a synching stage, a started stage, and a done stage for each individual one of the task states indicated by the working task descriptor.

14. The active/active data storage system of claim 13, wherein the program code stored in the memory of the primary storage processor and the memory of the secondary storage processor, when executed by the processing circuitry in the primary storage processor and the processing circuitry in the secondary storage processor, further causes the processing circuitry in the primary storage processor and the processing circuitry in the secondary storage processor to simultaneously transition the primary storage processor and the secondary storage processor through the synching stage, the started stage, and the done stage for each individual one of the task states indicated by the working task descriptor using a synching cluster flag and a done cluster flag on the primary storage processor and a synching cluster flag and a done cluster flag on the secondary storage processor.

15. The active/active data storage system of claim 14, wherein the program code stored in the memory of the primary storage processor and the memory of the secondary storage processor, when executed by the processing circuitry in the primary storage processor and the processing circuitry in the secondary storage processor, further causes the processing circuitry in the primary storage processor and the processing circuitry in the secondary storage processor to execute the function associated with the task state on both the primary storage processor and the secondary storage processor during each one of the task states indicated by the working task descriptor at least in part by executing the function associated with the task state during the started stage on both the primary storage processor and the secondary storage processor.

16. The active/active data storage system of claim 12, wherein each task descriptor contained in the task scheduling queue further indicates a rollback function to be executed on both the primary storage processor and the secondary storage processor in response to detecting a failure while executing the task descriptor; and
   wherein the program code stored in the memory of the primary storage processor and the memory of the secondary storage processor, when executed by the processing circuitry in the primary storage processor and the processing circuitry in the secondary storage processor, further causes the processing circuitry in the primary storage processor and the processing circuitry in the secondary storage processor to, in response to detection of a failure while executing a function associated with one of the task states indicated by the working task descriptor, execute a rollback function indicated by the working task descriptor on both the primary storage processor and the secondary storage processor.

17. The active/active data storage system of claim 16, wherein each task descriptor contained in the task scheduling queue further indicates a peer panic function to be executed in response to detecting a failure of either the primary storage processor or the secondary storage processor; and
   wherein the program code stored in the memory of the primary storage processor and the memory of the secondary storage processor, when executed by the processing circuitry in the primary storage processor and the processing circuitry in the secondary storage processor, further causes the processing circuitry in the primary storage processor and the processing circuitry in the secondary storage processor to, in response to detection of a failure of the primary storage processor while executing the working task descriptor, execute a peer panic function indicated by the working task descriptor on the secondary storage processor.

18. The active/active data storage system of claim 16, wherein each task descriptor contained in the task scheduling queue further indicates a peer panic function to be executed in response to detecting a failure of either the primary storage processor or the secondary storage processor; and wherein the program code stored in the memory of the primary storage processor and the memory of the secondary storage processor, when executed by the processing circuitry in the primary storage processor and the processing circuitry in the secondary storage processor, further causes the processing circuitry in the primary storage processor and the processing circuitry in the secondary storage processor to, in response to detection of a failure of the secondary storage processor while executing the working task descriptor, execute a peer panic function indicated by the working task descriptor on the primary storage processor.

19. The active/active data storage system of claim 12, wherein the program code stored in the memory of the primary storage processor and the memory of the secondary storage processor, when executed by the processing circuitry in the primary storage processor and the processing circuitry in the secondary storage processor, further causes the processing circuitry in the primary storage processor and the processing circuitry in the secondary storage processor to:

in response to detecting an event on the secondary storage processor, send a message from the secondary storage processor to the primary storage processor that contains a task descriptor associated with the event detected on the secondary storage processor;

in response to receipt by the primary storage processor of the message that contains the task descriptor associated with the event detected on the secondary storage processor, add the task descriptor associated with the event detected on the secondary storage processor to the task scheduling queue maintained only on the primary storage processor; and select the task descriptor associated with the event detected on the secondary storage processor from the task scheduling queue as a working task descriptor for execution on both the primary storage processor and the secondary storage processor.

20. A non-transitory computer readable medium for synchronizing event handling between a primary storage processor and a secondary storage processor in an active/active data storage system, the non-transitory computer readable medium comprising instructions stored thereon that when executed on processing circuitry perform the steps of:

maintaining a task scheduling queue only on the primary storage processor, wherein the task scheduling queue contains a plurality of task descriptors, wherein each task descriptor is associated with an event and is placed on the scheduling queue in response to detection of the associated event, wherein each task descriptor indicates an ordered set of task states, wherein each one of the task states is associated with a respective one of a plurality of functions that are to be executed in response to detection of the associated event;

selecting, from the task scheduling queue on the primary storage processor, a single working task descriptor at a time for execution on both the primary storage processor and the secondary storage processor;

sending a copy of the working task descriptor from the primary storage processor to the secondary storage processor; and executing the working task descriptor on both the primary storage processor and the secondary storage processor, wherein execution of the working task descriptor is uninterruptable by execution of any other task descriptor, and wherein executing the working task descriptor includes simultaneously transitioning through individual ones of the task states indicated by the working task descriptor on both the primary storage processor and the secondary storage processor, one task state at a time, in the order of the task states indicated in the working task descriptor, and, during each one of the task states indicated in the working task descriptor, executing the function associated with the task state on both the primary storage processor and the secondary storage processor.

* * * * *